(12) United States Patent
Singh et al.

(10) Patent No.: US 8,260,523 B2
(45) Date of Patent: Sep. 4, 2012

(54) METHOD FOR DETECTING GAS TURBINE ENGINE FLASHBACK

(75) Inventors: Kapil Kumar Singh, Rexford, NY (US); Balachandar Varatharajan, Loveland, OH (US); Gilbert Otto Kraemer, Greer, SC (US); Ertan Yilmaz, Glenville, NY (US); Benjamin Paul Lacy, Greer, SC (US)

(73) Assignee: General Electric Company, Niskayuna, NY (US)

( * ) Notice: Subject to any disclaimer, the term of this patent is extended or adjusted under 35 U.S.C. 154(b) by 583 days.

(21) Appl. No.: 12/434,695

(22) Filed: May 4, 2009

(65) Prior Publication Data

US 2010/0280732 A1 Nov. 4, 2010

(51) Int. Cl.
*G06F 17/00* (2006.01)
*G06G 7/70* (2006.01)
(52) U.S. Cl. ....................................................... 701/100
(58) Field of Classification Search ................... 701/100
See application file for complete search history.

(56) References Cited

U.S. PATENT DOCUMENTS

| | | | |
|---|---|---|---|
| 7,278,266 B2 | 10/2007 | Taware et al. | |
| 7,891,192 B2* | 2/2011 | Myers et al. | ..................... 60/741 |
| 2005/0268618 A1 | 12/2005 | Johnson et al. | |
| 2006/0272332 A1 | 12/2006 | Moraes | |
| 2007/0000228 A1* | 1/2007 | Ohri et al. | ..................... 60/39.37 |
| 2007/0089426 A1 | 4/2007 | Vandale et al. | |
| 2008/0078179 A1 | 4/2008 | Cai | |
| 2008/0267783 A1 | 10/2008 | Kraemer et al. | |
| 2009/0056335 A1* | 3/2009 | Myers et al. | ..................... 60/737 |
| 2010/0076698 A1* | 3/2010 | He et al. | ........................... 702/35 |
| 2010/0180564 A1* | 7/2010 | Ziminsky et al. | .............. 60/39.1 |
| 2010/0180674 A1* | 7/2010 | Ziminsky et al. | .......... 73/112.01 |
| 2010/0280732 A1* | 11/2010 | Singh et al. | ..................... 701/100 |

OTHER PUBLICATIONS

C. L Vandervort; "9 ppm NOx/CO Combustion System for "F" Class Industrial Gas Turbines"; Journal of Engineering for Gas Turbines and Power; Apr. 2001; vol. 123, Issue 2, 317-321.

Kelly Benson, Jimmy D. Thornton, Douglas L. Straub, E. David Huckaby, Geo. A. Richards; "Flame Ionization Sensor Integrated Into a Gas Turbine Fuel Nozzle"; Journal of Engineering for Gas Turbines and Power; Jan. 2005; vol. 127, Issue 1, 42-48.

Ben Zinn, Yedidia Neumeier, Tim Lieuwen; "Understanding and Control of Combustion Dynamics in Gas Turbine Combustors"; Jun. 30, 2005; DOE Award No. DE-FC26-02NT41431; UTSR Project No. 02-01-SR095; Downloaded from Internet:<http://www.clemson.edu/scies/utsr/FinalSR095.pdf>; 112 Pages.

R.K. Matta, G.D. Mercer, R.S. Tuthill; "Power Systems for the 21st Century—"H" Gas Turbine Combined-Cycles"; GE Power Systems, Schenectady, NY; Downloaded from Internet:<http://www.gepower.com/prod_serv/products/tech_docs/en/downloads/ger3935b.pdf>; 22 Pages.

\* cited by examiner

*Primary Examiner* — Mary Cheung
*Assistant Examiner* — Michael D Lang
(74) *Attorney, Agent, or Firm* — Ann M. Agosti

(57) ABSTRACT

A method for monitoring and controlling a gas turbine, comprises predicting frequencies of combustion dynamics in a combustor using operating conditions of a gas turbine, receiving a signal from a sensor that is indicative of combustion dynamics in the combustor, and detecting a flashback if a frequency of the received signal does not correspond to the predicted frequencies.

24 Claims, 8 Drawing Sheets

METHOD FOR DETECTING GAS TURBINE ENGINE FLASHBACK

This invention was made with Government support under contract number DE-FC26-05NT42643 awarded by U.S. Department of Energy. The Government has certain rights in the invention.

BACKGROUND

The invention relates generally to methods for controlling the operation of gas turbine engines and, more particularly, to a method of detecting flame-holding or flashback conditions in gas turbines using combustion dynamics.

Gas turbines engines include a compressor, a combustor, and a turbine coupled to the compressor. The combustor can include a plurality of combustor cans. Compressed air and fuel are delivered to the combustor cans to produce high-velocity and high-pressure combustion gases. These combustion gases are discharged to the turbine. The turbine extracts energy from the combustion gases for producing power that can be used in several ways such as, for example, to power the compressor, to power an electrical generator, or to power an aircraft.

Gas turbine engines operate under different load conditions that necessitate varying combustion operating conditions for the combustors to meet desired performance. A gas turbine combustor is designed to stabilize a flame at a desired location to ensure uninterrupted operation. However, under certain conditions during combustion of fuel, combustors can experience flame holding or flashback. Flashback is a phenomenon in which a flame travels upstream of the designed stabilization location towards fuel and air injection locations. During flame holding, the flame stabilizes upstream without traveling from a downstream location. In the following discussion, the term "flashback" is used to represent both flashback and flame holding, since the discussion applies equally to the both flashback and flame holding.

The conditions for occurrence of flashback change under different operating conditions of temperature, pressure, fuel to air ratio, and on type and composition of fuel. Flashback can occur through two different physical mechanisms broadly categorized as premixed and diffusion flashback. The geometry of a nozzle and its components play an important role in making a particular nozzle either flashback tolerant or flashback resistant. In addition, fuels containing high flame speed fuels, such as hydrogen, are known to have severe problems concerning flashback. Flashback can significantly damage injectors, swirlers, and nozzles. The operability of the combustor may be compromised and may cause unscheduled shutdown. On-field gas turbines are typically not well equipped to detect the onset of flashback. The nozzles may have features to control the damage due to flashback, but there is no proven reliable method to detect impending flashback.

It would therefore be desirable to provide a method for detecting an impending flashback or flame holding event in gas turbine engines using combustion dynamics.

BRIEF DESCRIPTION

In accordance with one embodiment disclosed herein, a gas turbine monitoring and controlling method comprises predicting frequencies of combustion dynamics in a combustor using operating conditions of a gas turbine, receiving a signal from a sensor that is indicative of combustion dynamics in the combustor, and detecting a flashback if a frequency of the received signal does not correspond to the predicted frequencies during normal operation.

In accordance with another embodiment disclosed herein, a gas turbine monitoring and controlling system comprises a combustion dynamics simulation and prediction system for predicting frequencies of combustion dynamics in a combustor, a data acquisition and analysis system for receiving a signal from a combustion dynamics sensor and providing an output signal, a flashback detection system for providing an impending flashback indicator if a frequency of the output signal from the data acquisition and analysis system does not correspond to the predicted frequencies from the combustion dynamics simulation and prediction system, and a controller for controlling the gas turbine if the impending or actual flashback indicator is provided.

In accordance with another embodiment disclosed herein, a gas turbine monitoring and controlling method comprises predicting frequencies and amplitudes of combustion dynamics in a combustor using operating conditions of a gas turbine and gas turbine modeling tools, receiving a signal from a sensor that is indicative of combustion dynamics in the combustor, detecting a flashback if a frequency of the received signal does not correspond to the predicted frequencies, and controlling the gas turbine if the flashback is detected.

In accordance with another embodiment disclosed herein, a gas turbine monitoring and controlling method comprises obtaining the operating conditions of a gas turbine in real-time, predicting frequencies and amplitudes of combustion dynamics in a combustor using the operating conditions of the gas turbine and gas turbine modeling tools, receiving a signal from a sensor that is indicative of combustion dynamics in the combustor, detecting a flashback if a frequency of the received signal does not correspond to the predicted frequencies during a normal operating condition, and controlling the gas turbine if the flashback is detected.

In accordance with another embodiment disclosed herein, a gas turbine monitoring and controlling system comprises a combustion dynamics simulation and prediction system including a physics-based combustion dynamics tool for predicting frequencies and amplitudes of combustion dynamics in a combustor using operating conditions of a gas turbine and gas turbine modeling tools, a data acquisition and analysis system for receiving a signal from a combustion dynamics sensor and providing an output signal, a flashback detection system for providing an impending flashback indicator if a frequency of the output signal from the data acquisition and analysis system does not correspond to the predicted frequencies from the combustion dynamics simulation and prediction system, and a controller for controlling the gas turbine if the impending or actual flashback indicator is provided.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein include a system and a method for detecting an impending flashback or flame holding event in gas turbine engines using combustion dynamics. The system and method uses combustion dynamics/instability pressure signals from a gas turbine and compares the frequencies of the pressure signals with normal modes of the combustor as predicted by a combustion model, for example a model generated using physics-based combustion dynamics analysis. Any mismatch is identified and highlighted as a confirmation of impending flashback or flame holding event. Although the system and method are described herein in the context of a heavy duty gas turbine engine employed for industrial application, the system and method are applicable to other combustion engine systems utilized in various applications such as, but not limited to, aircraft, marine, helicopter, and prime-mover applications. As used herein, singular forms such as "a," "an," and "the" include plural referents unless the context clearly dictates otherwise.

Figure 1:
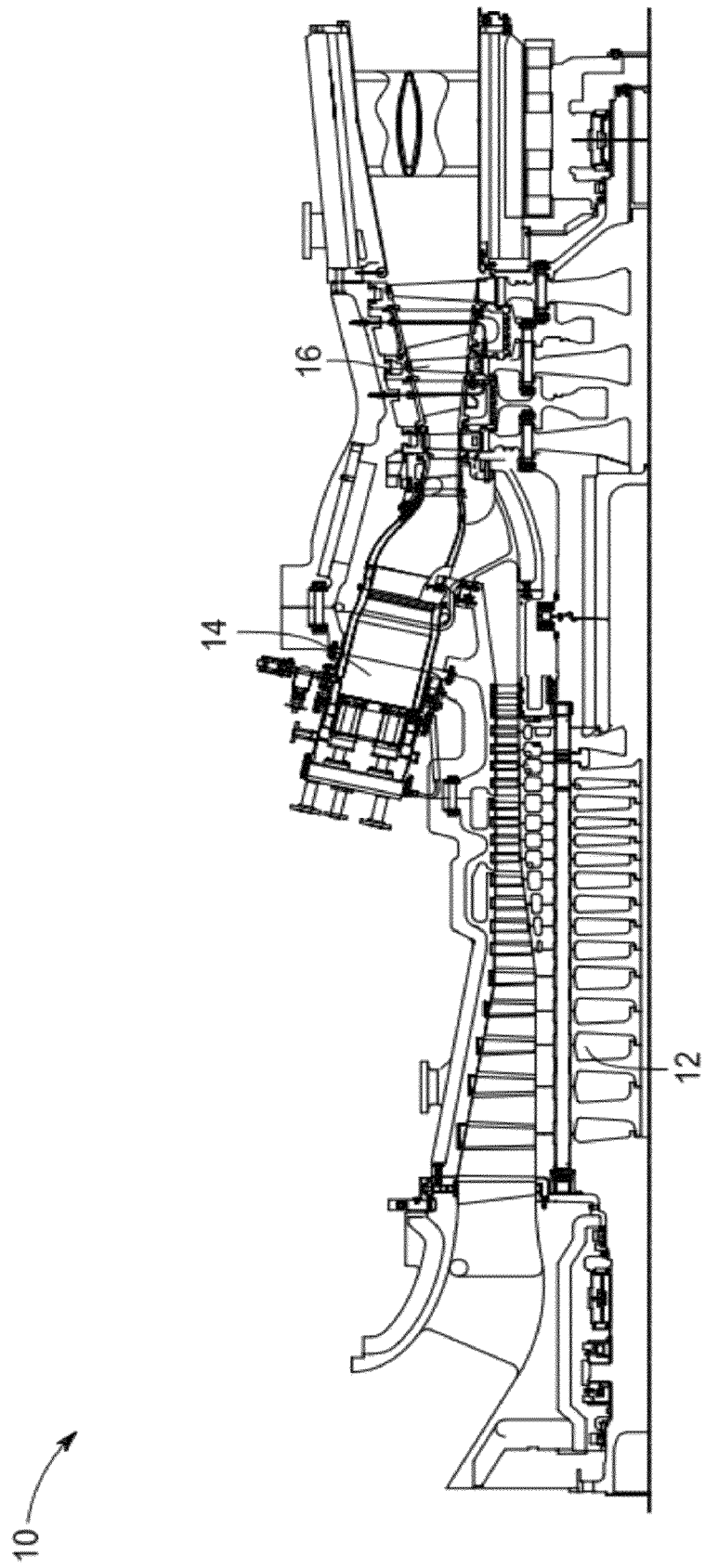
FIG. 1 is a schematic of a gas turbine engine system.

FIG. 1 illustrates an exemplary gas turbine engine 10. The gas turbine engine 10 includes a multi-stage axial compressor 12, a multi-can combustor 14, and a multi-stage turbine 16. Ambient air is drawn in by the compressor 12 and compressed to higher pressure and temperature. The compressed air is then supplied to the combustor 14. In the combustor 14, the incoming compressed air is mixed with fuel and the fuel-air mixture is combusted to produce high-pressure and high-temperature combustion gases. These combustion gases are discharged to the turbine 16. The turbine 16 extracts energy from the combustion gases. The energy extracted from the turbine 16 can be for various purposes such as generating electrical power, providing propulsive thrust, or providing shaft power for marine or prime mover applications.

Figure 2:
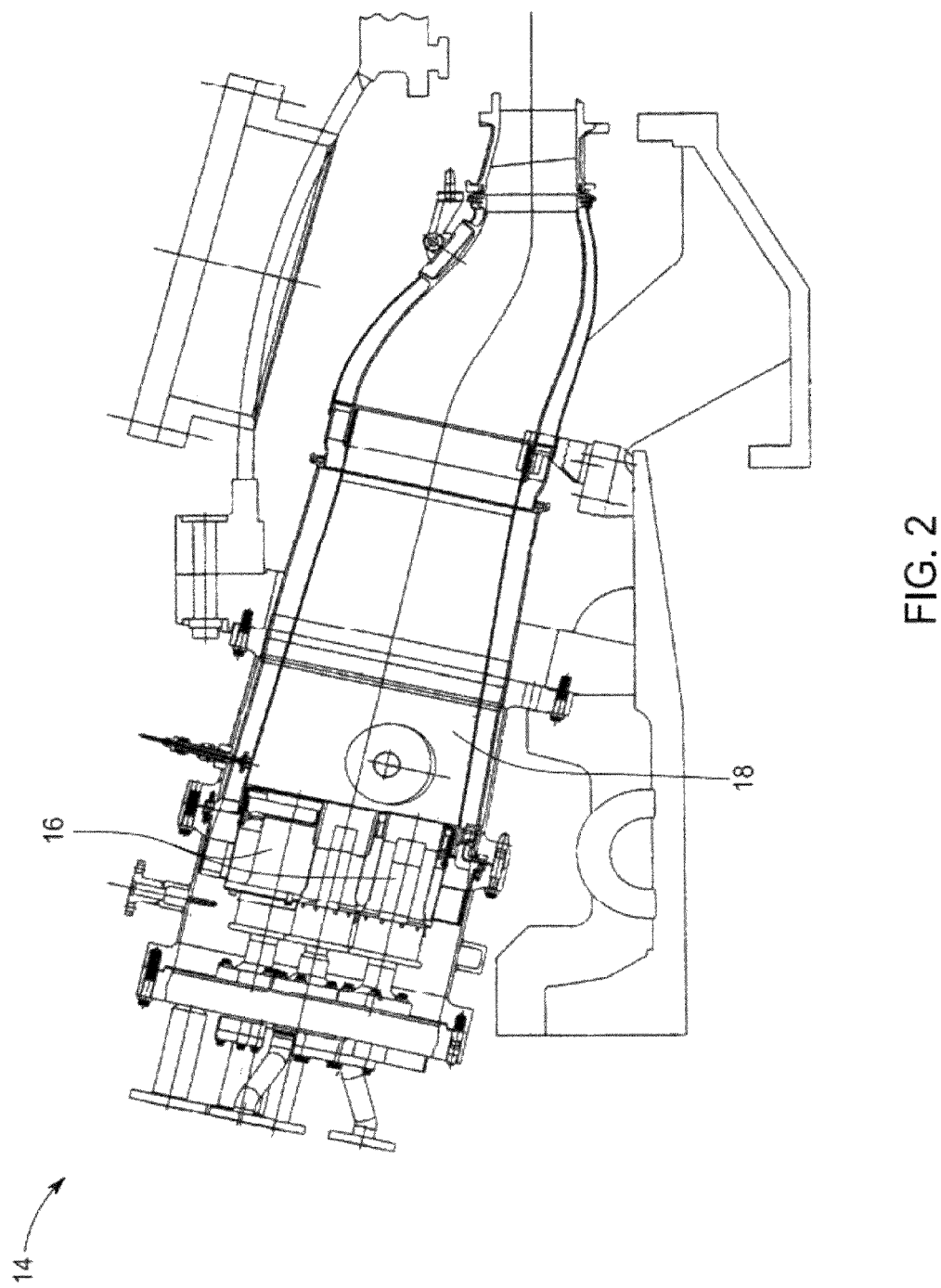
FIG. 2 is a schematic of a gas turbine combustor.

FIG. 2 is a schematic of a gas turbine combustor 14. The combustor 14 may be of annular, can, or can-annular type combustor. The combustor 14 can have different types of nozzles 16 depending on intended application. Modern low-emission combustors typically employ a pre-mixer nozzle in which fuel is injected in an air stream and mixed before reaching a combustion chamber 18. A typical combustor 14 will have multiple pre-mixer nozzle groups and different number of nozzles in each group. This is required to achieve performance objectives under various load conditions. The classification of various nozzle groups depends on their intended purpose.

Combustion dynamics/instability is an issue faced by all types of combustors. Due to the design, combustion dynamics are relatively more severe for pre-mixed combustion systems that were developed in order to achieve reduced emissions as stipulated by regulations. Combustion dynamics is a phenomenon where unsteady flame heat release from a flame inside a combustor locks on to the natural modes of the combustor, establishing a feedback cycle, leading to high-amplitude pressure oscillations in the combustor. These oscillations can restrict the operational envelope of the combustor and can even cause significant hardware damage. Depending on whether the unsteady combustion excites the longitudinal, radial, or circumferential combustor mode, the frequency of combustion dynamics can range from as low as 100 Hz to multiple kilo Hz range. Current state-of-the-art in combustion dynamics permits simulation, computation, and prediction of these frequencies, their propensity of being excited by flame, and the resultant pressure pulsation amplitude from physics-based analysis.

Figure 3:
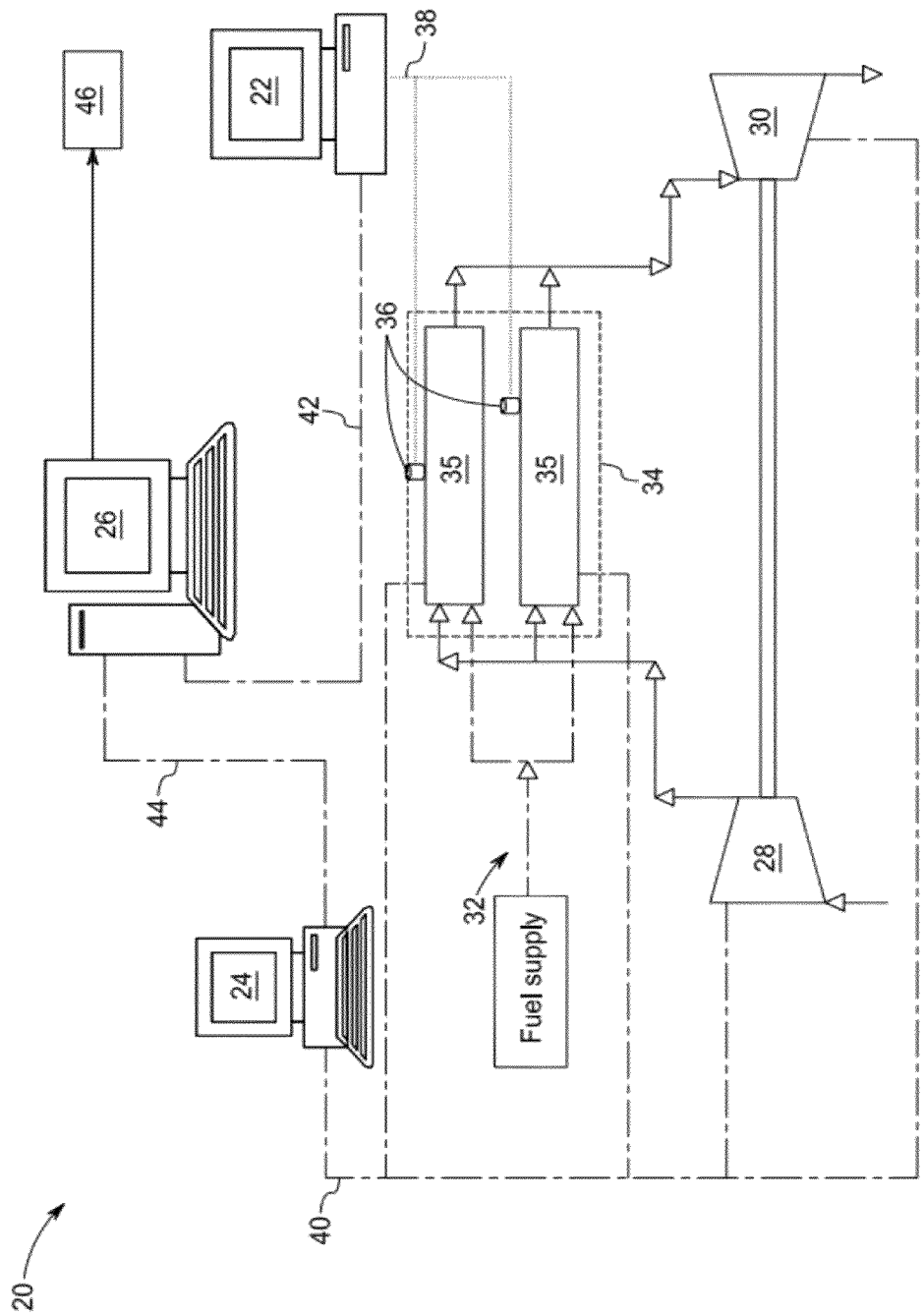
FIG. 3 illustrates a block diagram of a gas turbine monitoring and controlling system in accordance with aspects disclosed herein.

FIG. 3 illustrates a block diagram of an embodiment of a gas turbine monitoring and controlling system 20. The system 20 detects an impending flashback and controls a gas turbine after detecting the flashback. The system 20 includes a data acquisition and analysis system (DAAS) 22, a combustion dynamics simulation and prediction system (CDSPS) 24, and a flashback detection system (FDS) 26. Main components of a gas turbine such as a compressor 28, a turbine 30, fuel supply system 32, and a combustor 34 that can include multiple combustor cans 35 are shown. Although only two combustor cans 35 are shown, the system can have any number of combustor cans. Fuel supply 32 may be split in various nozzle-groups and vary under different load conditions. In one embodiment, each combustor can 35 is equipped with a combustor sensor 36 to measure the combustion dynamics. However, it may not be necessary to have a sensor 36 for each can 35. The sensors 36 can be selectively provided only on some combustor cans 35.

The sensor 36 generates signals representing combustion dynamics. The sensor 36 can monitor either pressure fluctuations or flame perturbations inside the combustor can. Therefore, the sensor 36 can be a pressure sensor or a flame sensor such as an optical or chemical sensor for measuring flame response. The signals 38 from the sensor are provided to the DAAS. The operating conditions 40 of the compressor 28, the combustor can 35, and the turbine 30 are also monitored at the same time and provided to the CDSPS 24. The output 42 from the DAAS 22 and the output 44 from the CDSPS 24 are then provided to the flashback detection system (FDS) 26 for determining impending or actual flashback. The flashback detection system (FDS) 26 provides any impending flashback indicator to the gas turbine controller 46. The detailed procedure involved in providing an impending flashback indicator is explained in reference to FIG. 6.

Figure 4:
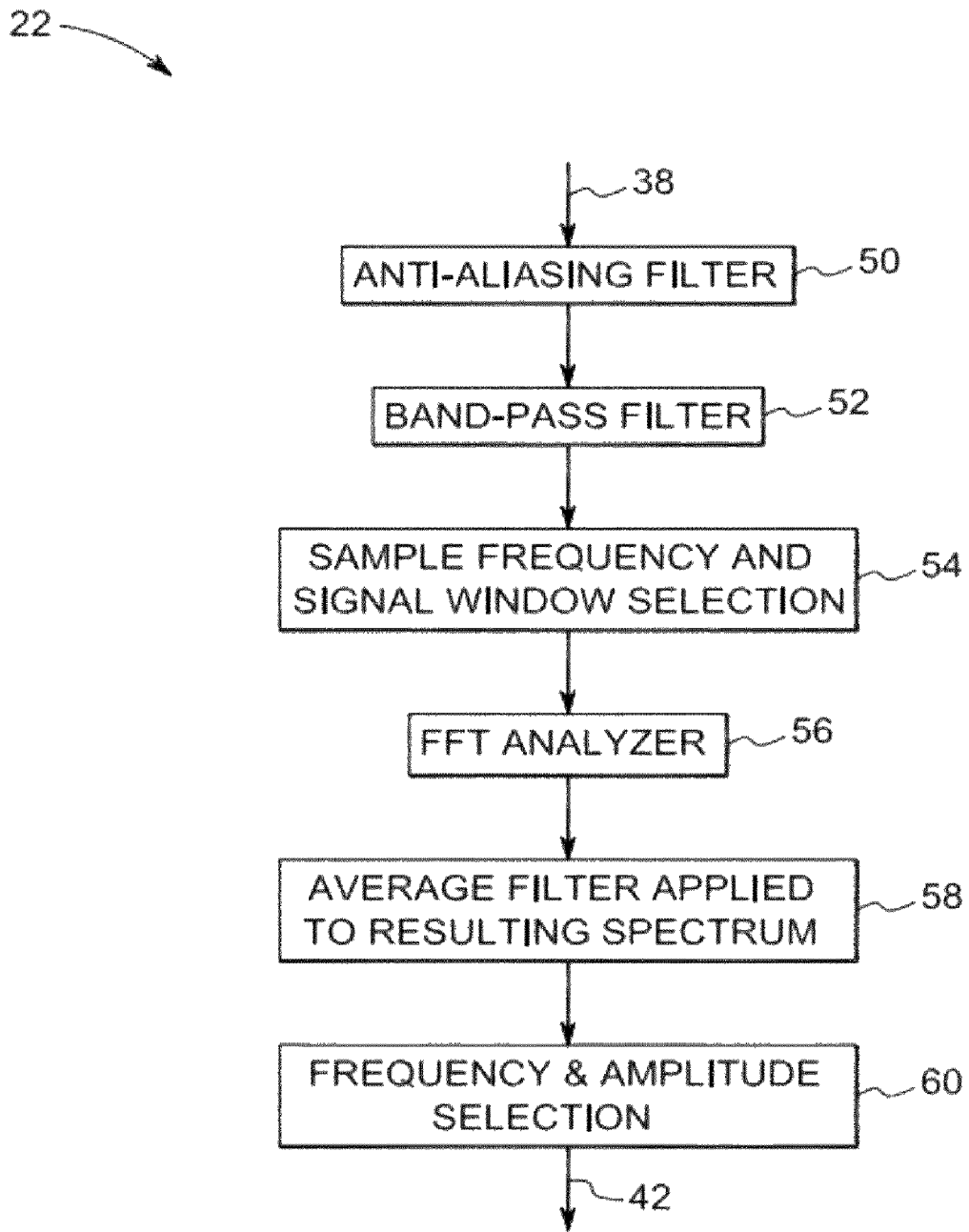
FIG. 4 illustrates a block diagram of data acquisition and analysis system in accordance with aspects disclosed herein.

FIG. 4 illustrates a block diagram of the data acquisition and analysis system (DAAS) 22. Several signal processing techniques can be used for processing the signals 38 received from the combustor can, to generate an output that accurately represents combustion dynamics of the combustor can. In one embodiment, the combustion dynamics signals 38 from the gas turbine are passed through an anti-aliasing filter 50 to ensure minimum distortion from high frequency components. The signal is then processed through a band-pass filter 52 in order to curtail frequency content of the signal to yield data within a frequency band of interest. A determination of sampling frequency is then made at block 54 according to Nyquist criterion that states that a sampling frequency must be at least twice the maximum frequency of interest. Similarly, a sampling window is selected in line with required frequency resolution and energy leakage. The signal is then supplied to a Fast Fourier Transform (FFT) analyzer 56 that converts a time-domain signal to a frequency-domain signal. The frequency spectra are averaged at block 58 over multiple instances (for example 64) in order to obtain a more representative signal content that is not influenced by transients in the system. The averaged spectra are then evaluated and the peak frequency and its amplitude in various bands are determined at block 60. This peak frequency and amplitude data forms the output signal 42 that is provided to the FDS.

Figure 5:
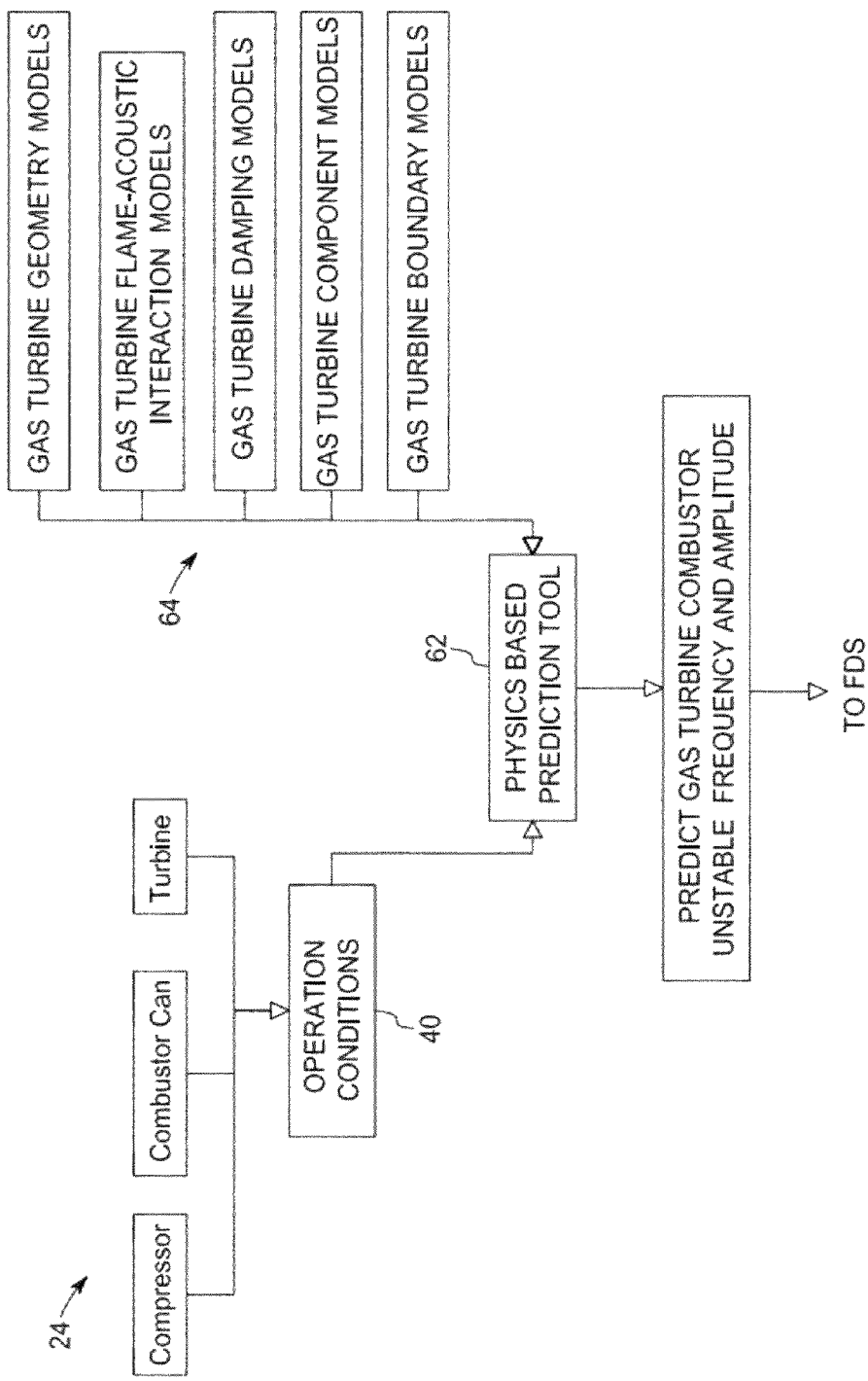
FIG. 5 illustrates a block diagram of combustion dynamics simulation and prediction system in accordance with aspects disclosed herein.

FIG. 5 illustrates a block diagram of CDSPS 24. The CDSPS includes a physics-based combustion dynamics prediction tool 62 and various combustion dynamics modeling tools 64. These combustion dynamics modeling tools are based on the state-of-the-art combustion dynamics models and are well known in the art. The combustion dynamics models include gas turbine geometry models, gas turbine flame-acoustic models, gas turbine damping models, gas turbine component models, and gas turbine boundary conditions. Operating conditions 40 data from the compressor, the combustor, and the turbine is collected in real-time and provided to the physics-based prediction tool 62.

The physics-based prediction tool 62 receives the operating conditions 40 as an input and uses the aforementioned combustion dynamics models 64 to compute the various acoustic modes of the combustor can, instability of the combustor can, and the associated amplitude. Specifically, the physics-based prediction tool predicts frequency and amplitude of combustion dynamics using the combustion dynamics modeling tools and the operating conditions of the gas turbine. The results from the physics based prediction tool, i.e. the predicted frequency and amplitude, are provided to the FDS in real-time.

Figure 6:
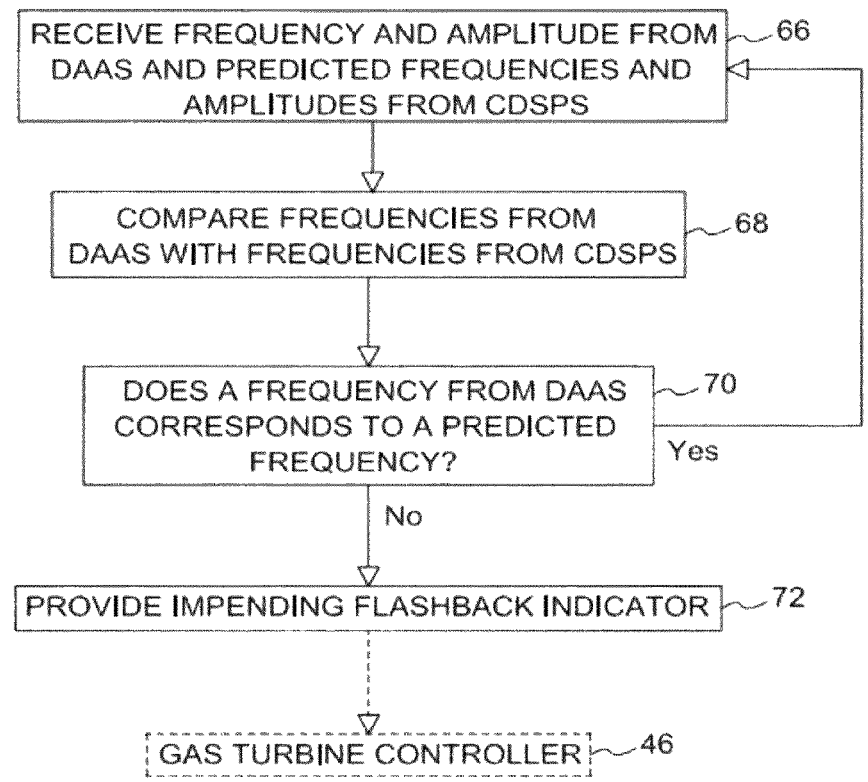
FIG. 6 illustrates a flowchart of an algorithm used by the flashback detection system in accordance with aspects disclosed herein.

FIG. 6 illustrates a block diagram of the procedure or algorithm used by the FDS 26. The FDS receives the combustion dynamics frequency and amplitude from the DAAS and predicted frequencies and amplitudes from the CDSPS at block 66. The FDS compares the combustion dynamics frequency from the DAAS with the predicted combustion dynamics frequencies within known uncertainties of both the DAAS and the CDSPS at block 68. A determination of whether the frequency of the received signal corresponds to any of the predicted frequencies is made at block 70. If the combustion dynamics frequency corresponds to a predicted frequency indicating the presence of a flame in a designed location, then the FDS rejects the current combustion dynamics data as normal operation and proceeds to analyze data obtained at the next instance. A condition in which a flame is in a designed location is interpreted as a normal operating condition of a combustor can.

A combustion dynamics frequency that does not correspond to the predicted frequencies indicates an abnormal operating condition, meaning that the flame is not in a designed location and the flame location is indicative of an impending flashback or flame holding. Therefore, if the combustion dynamics frequency does not correspond to any of the predicted frequencies indicating the presence of a flame in its designed location, then the FDS provides an impending flashback indicator at block 72.

The FDS 26 provides the impending flashback indicator to the gas turbine controller 46. The controller 46 can shut down the gas turbine to prevent damage to hardware. The controller 46 can also adjust operating conditions of the gas turbine to avert the flashback event.

Figure 7:
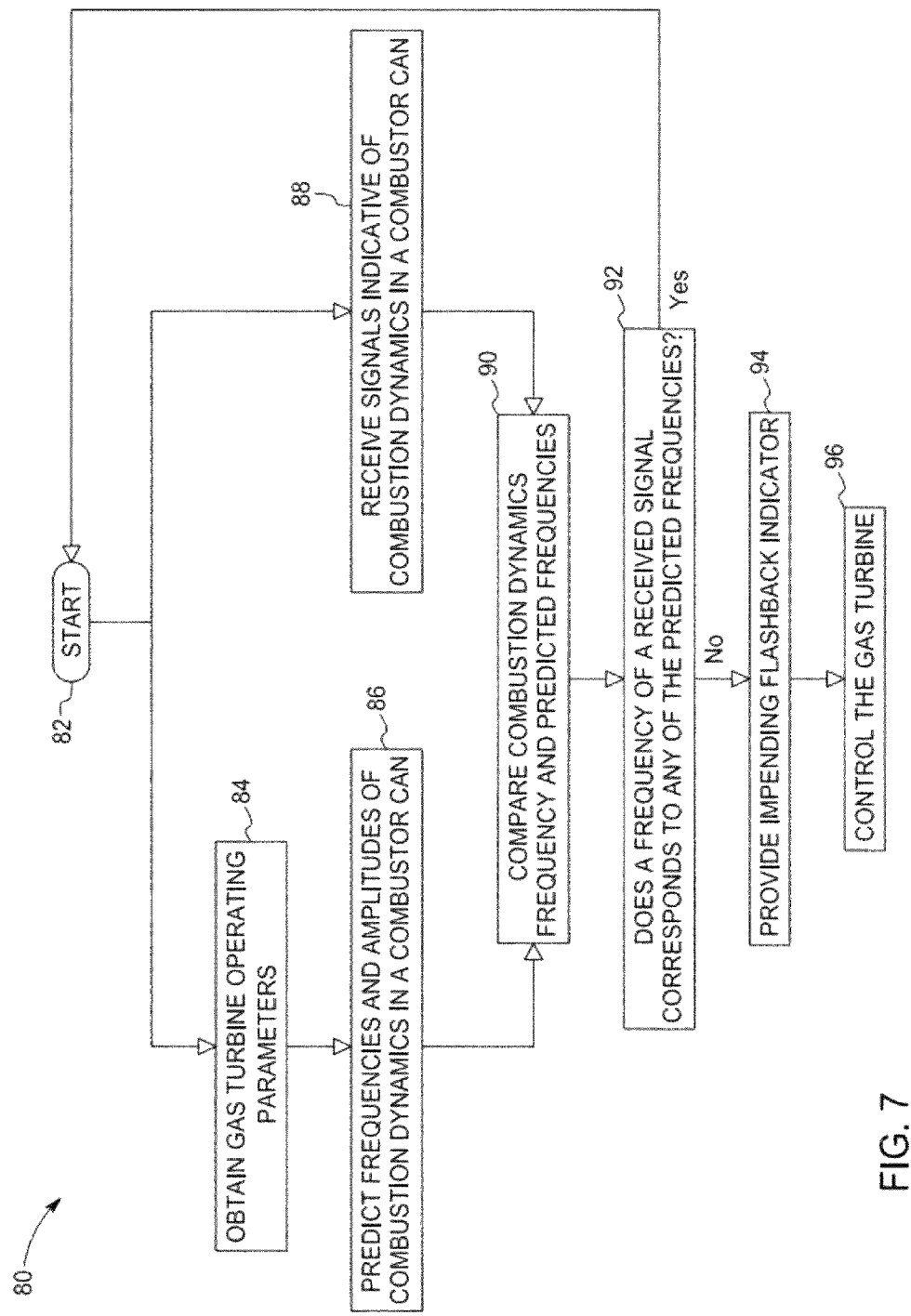
FIG. 7 illustrates a flowchart of a gas turbine monitoring and controlling method in accordance with aspects disclosed herein.

FIG. 7 illustrates a gas turbine monitoring and controlling method 80. The method starts at block 82. At block 84 operating conditions of the gas turbine are obtained in real-time. At block 86, a physics-based combustion dynamics prediction model predicts frequencies and amplitudes of combustion dynamics in a combustor using the obtained operating conditions and various combustion dynamics modeling tools. At block 88, signals indicative of combustion dynamics in a combustor can are received from a sensor associated with the combustor can. At block 90, frequencies of the received combustion dynamics signals and the predicted combustion dynamics frequencies are compared. At block 92, a determination of whether the frequency of the received signal corresponds to any of the predicted frequencies is made. If the frequency of the received signal corresponds to any of the predicted frequencies, then it is determined as a normal operation and the method proceeds to block 82. If the frequency of the received signal does not correspond to any of the predicted frequencies, then the method proceeds to block 94. At block 94, an impending flashback indicator is provided. Following which, the gas turbine is controlled at block 96. The gas turbine can be shut down to prevent damage to hardware. Alternately, operating conditions or fuel delivery of the gas turbine can be adjusted to avert or dislodge the flashback event.

Figure 8:
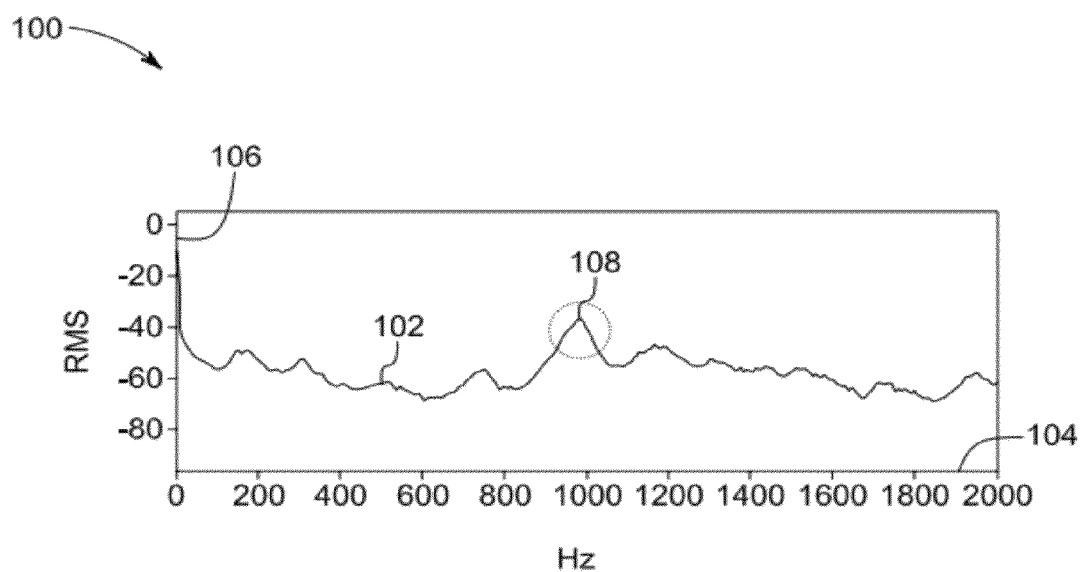
FIG. 8 is a graph showing a signal of combustion dynamics data obtained at gas turbine operating conditions in accordance with aspects disclosed herein.

FIG. 8 illustrates an exemplary graph 100 of a signal 102 of combustion dynamics data obtained from experiments conducted at operating conditions of a gas turbine. The signal 102 is plotted in frequency-domain. As described previously, an FFT analyzer is used to obtain a frequency-domain signal. The X-axis is the frequency 104 and the Y-axis 106 is a root mean square (RMS) value 106. The RMS value of the signal can be calculated using coefficients resulting from FFT analysis. Experimental investigations revealed that the frequency of 1000 hertz 108 did not correspond to predicted frequencies from the CDSPS. The value of the frequency alone may not be indicative of an impending flashback. The predicted frequencies can include a range of frequencies during normal operating conditions. Therefore, frequencies of the signal 102 are compared to the predicted frequencies and any particular frequency (in this case 1000 Hz) that does not correspond to the predicted frequencies indicates an abnormal operating condition. This abnormal operating condition is due to the flame not being in a designed location, indicating an impending flashback or possible flame-holding event. A flame that has moved or shifted from its design location excites different natural modes of the system or its components compared to the flame stabilized at its desired location.

The gas turbine monitoring and controlling system and method described above thus provide a way to successfully determine an impending flashback and control the gas turbine in advance to prevent any damage. The detection of impending flashback provides the opportunity to adjust operating conditions of the gas turbine to avoid flashback or to shutdown the gas turbine before the occurrence of flashback. The system and method are applicable to gas turbines using fuels such as, but not limited to, various mixtures of natural gas, hydrogen, carbon monoxide, and nitrogen, and a variety of other combustible fuels such as propane, ethylene, gasoline, kerosene, diesel fuel, jet fuel, bio-fuel, bio-diesel, syngas, and heavy oil.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for monitoring and controlling a gas turbine, comprising:
   obtaining operating conditions of a gas turbine in real-time;
   predicting frequencies and amplitudes of combustion dynamics in a combustor using the real-time operating conditions of the gas turbine and gas turbine modeling tools;
   receiving a signal from a sensor that is indicative of combustion dynamics in the combustor;
   detecting a flashback if a frequency of the received signal does not correspond to the predicted frequencies during a normal operating condition; and
   controlling the gas turbine if the flashback is detected.

2. The method of claim 1, wherein obtaining the operating conditions of the gas turbine comprises obtaining the operating conditions of a compressor, a combustor, and a turbine of the gas turbine.

3. The method of claim 1, further comprises predicting frequencies of combustion dynamics in the combustor using operating conditions of the gas turbine and gas turbine modeling tools.

4. The method of claim 3, wherein the gas turbine modeling tools comprise gas turbine geometry models, gas turbine flame-acoustic models, gas turbine damping models, gas turbine component models, gas turbine boundary conditions, or combinations thereof.

5. The method of claim 3, further comprises predicting amplitudes of combustion dynamics in the combustor using operating conditions of the gas turbine and the gas turbine modeling tools.

6. The method of claim 5, wherein the predicted frequencies and amplitudes correspond to a designed flame location in the combustor, indicating normal operating conditions of the combustor.

7. The method of claim 5, wherein predicting the frequencies and amplitudes comprises predicting the frequencies and amplitudes using a physics-based combustion dynamics model.

8. The method of claim 1, wherein the sensor comprises a dynamic pressure sensor or a flame sensor.

9. The method of claim 1, wherein receiving the signal comprises:
   filtering the received signal;
   converting the filtered signal into a frequency domain signal; and
   determining a peak frequency and an amplitude of the peak frequency.

10. The method of claim 9, wherein detecting the flashback comprises detecting the flashback if the peak frequency does not correspond to the predicted frequencies.

11. The method of claim 1, wherein controlling the gas turbine comprises shutting down the gas turbine.

12. The method of claim 1, wherein controlling the gas turbine comprises adjusting operating parameters of the gas turbine to avoid flashback.

13. A gas turbine monitoring and controlling system, comprising:
   a combustion dynamics simulation and prediction system for predicting frequencies of combustion dynamics in a combustor, wherein the combustion dynamics simulation and prediction system obtains the operating conditions of the gas turbine in real-time;
   a data acquisition and analysis system for receiving a signal from a combustion dynamics sensor and providing an output signal;
   a flashback detection system for providing an impending flashback indicator if a frequency of the output signal from the data acquisition and analysis system does not correspond to the predicted frequencies from the combustion dynamics simulation and prediction system; and
   a controller for controlling the gas turbine if the impending flashback indicator is provided.

14. The system of claim 13, wherein the combustion dynamics simulation and prediction system includes a physics-based combustion dynamics tool for predicting the frequencies using operating conditions of the gas turbine and gas turbine modeling tools.

15. The system of claim 14, wherein the gas turbine modeling tools comprise gas turbine geometry models, gas turbine flame-acoustic models, gas turbine damping models, gas turbine component models, gas turbine boundary conditions, or combinations thereof.

16. The system of claim 14, wherein the combustion dynamics simulation and prediction system further predicts amplitudes of combustion dynamics using operating conditions of the gas turbine and the gas turbine modeling tools.

17. The system of claim 16, wherein the predicted frequencies and amplitudes correspond to a designed flame location in the combustor, indicating normal operating conditions of the combustor.

18. The system of claim 13, wherein the operating conditions of the gas turbine comprises operating conditions of a compressor, a combustor, and a turbine of the gas turbine.

19. The system of claim 13, wherein the data acquisition and analysis system processes the signal received from the combustion dynamics sensor to provide the output signal, wherein processing the received signal comprises filtering the received signal, converting the filtered signal into a frequency domain signal, and determining a peak frequency and an amplitude of the peak frequency.

20. The system of claim 19, wherein the output signal comprise the peak frequency.

21. The system of claim 20, wherein the flashback detection system provides the impending flashback indicator if the peak frequency does not correspond to the predicted frequencies from the combustion dynamics simulation and prediction system.

22. The system of claim 13, wherein the controller shuts down the gas turbine if the impending flashback indicator is provided.

23. The system of claim 13, wherein the controller adjusts operating parameters of the gas turbine if the impending flashback indicator is provided.

24. The system of claim 13, wherein the sensor comprises a dynamic pressure sensor or a flame sensor.

* * * * *